United States Patent

[11] 3,615,862

[72] Inventors: Hilton A. Roth, Cheshire; William R. Lasko, Glastonbury, both of Conn.
[21] Appl. No. 617,131
[22] Filed Feb. 20, 1967
[45] Patented Oct. 26, 1971
[73] Assignee United Aircraft Corporation, East Hartford, Conn.

[54] FUEL CELL ELECTRODES
14 Claims, 4 Drawing Figs.

[52] U.S. Cl. ................................... 136/120 FC, 204/39
[51] Int. Cl. ................................... C23b 5/24, H01m 13/04
[50] Field of Search ........................... 136/120 FC, 86; 204/47, 39

[56] References Cited

UNITED STATES PATENTS

| | | | |
|---|---|---|---|
| 2,093,406 | 9/1937 | Atkinson | 204/39 |
| 3,291,643 | 12/1966 | Oswin et al. | 136/120 |
| 3,226,309 | 12/1965 | Oxley | 204/39 |
| 3,309,292 | 3/1967 | Andrews | 204/39 |
| 3,393,098 | 7/1968 | Hartner et al. | 136/120 |
| 3,415,734 | 12/1968 | Kalhammer | 136/86 |

OTHER REFERENCES

Fischer et al. Precious Metal Plating R. Draper Ltd., Teddington 3-9-65 pp. 216 & 217 relied on Primary Examiner—Winston A. Douglas
Assistant Examiner—M. J. Andrews
Attorney—Finnegan, Henderson & Farabow ABSTRACT: Activated fuel cell electrodes are prepared by electrodeposition of a noble metal catalyst on a solid foil or porous electrode substrate. The electrodeposition is effected from an alkali metal hydroxide solution, preferably molten alkali metal hydroxide. The electrolysis is generally carried out at temperatures of about 300° to 500° F. at current densities of about 5 to 150 ma./cm.² by passing a direct electrical current to the electrode substrate through the alkali metal hydroxide electrolyte solution. Palladium-black is a preferred noble metal catalyst, and palladium or palladium-silver alloy foils and porous sintered nickel structures are the preferred electrode substrates.

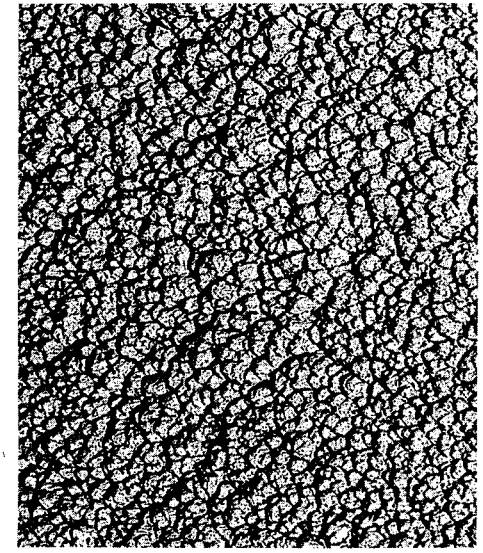

FUEL CELL ELECTRODES

This invention relates to the production of fuel cell electrodes. More particularly, it relates to a process for the activation of fuel cell electrodes by the electrolytic deposition of a noble metal catalyst on the surface of the electrodes.

Normally, fuel cells are composed of five basic components—two inert electrodes, two gas supply means (fuel and oxidant), and an electrolyte. The electrodes act as a meeting place for the fuel (anode) and oxidant (cathode) and also pickup electrons liberated and transferred in the operation of the cell. The electrolyte transfers the ions formed by the reactions at the cell electrodes from one electrode to the other. Exemplary are intermediate temperature fuel cells which are generally characterized by the use of hydrogen as the fuel gas, either oxygen or air as the oxidant, and by operation at intermediate temperature levels of 300° to 550° F.

These cells, operating on hydrogen or oxygen, normally use reactant gas pressures of about 40 to 400 p.s.i.a., although gas pressures of up to 800 p.s.i.a. or higher can be used. The electrodes of intermediate temperature cells can be constructed of various suitable materials, such as porous sintered nickel (Ni); or metal foils of palladium (Pd) or palladium-silver (Pd–Ag) alloys.

As pointed out above, the basic current of the fuel cell is generated by the reactions that occur at the electrodes of the cell. In an intermediate temperature hydrogen-oxygen fuel cell, hydrogen gas is consumed at the anode, producing hydrogen ions and electrons, in accordance with the following reaction:

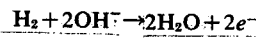

$$H_2 + 2OH^- \rightarrow 2H_2O + 2e^-$$

The electrons flow to the cathode through an external load circuit. Oxygen supplied to the cathode and water from the electrolyte accept these electrons and form the negatively charged hydroxyl ions which migrate to the anode, in accordance with the following reaction:

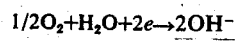

$$1/2 O_2 + H_2O + 2e \rightarrow 2OH^-$$

These electrons travel from the anode to the cathode through an external load circuit, thereby producing the desired current flow.

The overall fuel cell reaction can thus be summarized as:

$$H_2 + 1/2 O_2 \rightarrow H_2O + \text{Electrical Energy} + \text{Heat}$$

The hydroxyl ions formed at the cathode replace the hydroxyl ions removed from the electrolyte by reaction with hydrogen ions in the vicinity of the anode. Excess water produced at the anode and not used in the reaction of the cathode is removed from the cell along with either the excess oxygen or hydrogen being purged from the cell electrodes.

A variety of types of electrodes have been utilized in fuel cells. Exemplary are the porous electrodes which are generally fabricated from metal felt or sintered metal powder. In using such electrodes, the reactant gas is forced into the pores of the electrode where it interfaces with the electrolyte. Another type of electrode is the solid metal gas-diffusion electrode which is constructed of a metal membrane or foil. The fuel or oxidant gas is transmitted through such solid electrodes by diffusion. Gas molecules, such as $H_2$, dissociate and absorb on the surface of the electrode. The absorbed atoms then diffuse through the metal lattice to the electrolyte-metal interface. The diffused atom releases an electron within the electrode and enters the electrolyte as an ion. The electron flows through the external circuit to the cathode.

In the preparation of fuel cell electrodes, it is desirable to deposit a noble metal catalyst, such as platinum or palladium, on the electrode surface. The presence of such catalyst on the electrode increases the rate of the electrode reactions and hence the output efficiency of the cell.

Catalyst activation is particularly important when solid metal electrodes are used, because the catalyst also acts to increase the rate of adsorption of the gas molecules on the gas side of the electrode. The current produced by a fuel cell is determined by the rate at which the reactions proceed at the cell electrodes. In order to produce large current outputs from the cell, it is important to replenish the reactants at the reaction interface as fast as they are used in the cell reactions. As a result, an increase in the rate of adsorption and transport of the reactant gases through such metal electrodes is of considerable significance.

Although the treatment of electrode surfaces by catalyst deposition has proved more effective than other methods of activating electrodes, which include etching or sand blasting of the electrode surface, the techniques previously used for catalyst deposition have not proved entirely satisfactory. Prior art catalyst deposition procedures have been primarily deficient in their failure to achieve both stability and high levels of performance of the electrodes during operation of the cell. The catalyst applied by these prior art techniques degrades during cell operation, and produces a resultant reduction of cell performance.

These prior art methods have largely utilized replacement reactions to deposit the catalyst of the electrode. In these reactions, the electrode is charged with hydrogen, and the catalyst, such as palladium, is deposited by contacting the electrode with a solution containing palladium ions. The dissolved hydrogen in the electrode is replaced by the palladium metal catalyst to produce an activated electrode structure.

The degradation of the catalyst applied by replacement techniques is believed to be caused by several phenomena including catalyst poisoning, the migration of catalysts into the electrode, the sintering of catalyst particles to each other, and the like, with a resultant loss of available catalytic surface area. Thus, while electrodes activated by catalyst replacement reactions may afford high initial reactant gas transfer rates, their performance deteriorates rapidly during operation of the cell. The reactant gas transport rate decreases to undesirably low levels with a corresponding reduction in the performance and efficiency of the cell.

Accordingly, to overcome the foregoing disadvantages of the prior art procedures, it is a primary and general object of the present invention to provide an improved process for the catalytic activation of fuel cell electrodes.

Another object of this invention is to provide an improved process for the deposition of an activating catalyst onto a fuel cell electrode, which affords stability of catalytic activation during operation of the cell.

A further object of this invention is to provide an improved process for catalytic activation of fuel cell electrodes which produces increased reactant gas transfer rates through the activated electrodes.

A still further object of this invention is to provide an improved process for the deposition of a noble metal catalyst on a fuel cell electrodes surface to provide an activated electrode that achieves high reactant gas transfer rates to the reaction sites at the electrolyte interface, and which achieves this improved performance over extended periods of cell operation.

Yet a further object of this invention is to provide a process for catalytic activation of fuel cell electrodes in which the catalyst is deposited on the electrode in a stable form to provide an electrode which is resistant to loss of available catalytic surface area and provides stable reactant gas transfer rates during cell operation.

Additional objects and advantages of this invention will be set forth in part in the description that follows, and in part will be obvious from the description, or may be learned by practice of the invention, the objects and the advantages being realized and attained by means of the methods, processes, articles, combinations and improvements particularly pointed out in the appended claims.

To achieve the foregoing objects and in accordance with its purpose, this invention provides a process for activating fuel cell electrodes to improve and stabilize the catalytic activity and the transport rate of reactant gases through the electrodes during cell operation. This process comprises inserting the electrodes to be activated into an alkali metal hydroxide electrolyte solution containing a minor amount of a salt of a noble metal catalyst, and then depositing the catalyst on the electrode surface from the alkali metal hydroxide solution by electrolysis. During electrolysis, the alkali metal hydroxide electrolyte solution is maintained at a temperature below its boiling point, but at least as great as the temperature to which the activated electrode is to be subjected during subsequent operation in a fuel cell. The noble metal catalyst is precipitated onto the surface of the electrode by passing a direct current (DC) through the electroplating cell.

In addition to the description herein, the present invention is further illustrated by the accompanying drawings which are photomicrographs of the surface of catalytically activated electrodes produced by both the process of the present invention and by prior art replacement plating techniques, as will be described more specifically hereinafter.

In the drawings

FIG. 1 is a photomicrograph, enlarged 7,000 times, of the surface of a palladium-silver (Pd-Ag) foil electrode activated by the deposition of a palladium-black catalyst on the foil electrode in accordance with the process of this invention.

FIG. 2 is a photomicrograph, magnified 7,000 times, of the surface of the palladium activated foil electrode of FIG. 1 after 30 hours of $H_2$ cycling at a temperature of 45° F. and a pressure differential across the foil of 600 millimeters of mercury (Hg).

FIG. 3 is an photomicrograph, magnified 4,000 times, of a palladium activated Pd-Ag foil electrode, produced by conventional replacement plating techniques at ambient temperatures.

FIG. 4 is a photomicrograph, magnified 4,000 times, of the surface of the palladium activated electrode of FIG. 3 after 30 hours of $H_2$ cycling at a temperature of 450° F. and a pressure differential across the foil of 600 millimeters of Hg.

In accordance with the process of this invention, the electrode to be activated is inserted in an alkali metal hydroxide electrolyte solution containing a minor amount of a salt of a noble metal catalyst. The basic electrode structure to be activated can be of any desired form, such as, for example, a solid foil sheet, a metal screen, a porous sintered metal powder, or a metal felt. While the catalytic activation process of the present invention is particularly beneficial in improving the reactant gas transfer rate through solid foil electrode structures, the process can also be utilized to activate other types of electrodes, such as single porosity electrodes, or biporous electrodes of the type conventionally used in Bacon-type fuel cells.

The electrode substrate may be constructed of any transition metal conventionally used in the production of fuel cell electrodes, such as, for example, nickel (Ni), palladium (Pd), alloys of palladium and silver (Pd-Ag), zirconium (Zr), titanium (Ti), molybdenum (M0), or iron (Fe). Nickel, palladium, and Pd-Ag alloy electrodes are preferred.

A critical requirement of the present process is the deposition of the catalyst onto the electrode surface from an alkali metal hydroxide electrolyte solution. Any suitable alkali metal hydroxide can be used as the electrolyte solution in which the electrolysis or plating step of the process is carried out. Molten alkali metal hydroxides are the preferred electrolytes. For example, potassium hydroxide (KOH), lithium hydroxide (LiOH), cesium hydroxide (CsOH), sodium hydroxide (NaOH), or rubidium hydroxide (RbOH) can be used. Although not necessary, it is generally preferred to utilize in the activation process the same electrolyte in which the activated electrode is to be used in the operation of the cell. Thus, for example, if the activated electrode is to be used in a fuel cell with a potassium hydroxide electrolyte, it is desirable to also use a potassium hydroxide electrolyte solution in the activation process of this invention.

The alkali metal hydroxide electrolyte maybe of any desired concentration so long as it has a boiling point above the temperature at which the electrolysis is to be carried out. As pointed out above, however, molten alkali metal hydroxide solutions, and particularly molten KOH solutions, are preferred electrolytes in the present process.

In accordance with the invention, the alkali metal hydroxide electrolyte solution contains a minor amount of a salt of a noble metal catalyst. This noble metal supplies the metal catalyst which is precipitated on the electrode substrate in the electrolysis step of the present process. Any noble metal salt can be used that is soluble in the alkali metal hydroxide electrolyte solutions, and hence provides the necessary metal ions in the electrolyte for electrolytic deposition on the electrode substrate. Taking palladium-black as exemplary of the noble metal catalysts to be deposited on the electrode, such salts as palladium chloride, palladium nitrate, palladium sulfate, palladium phosphate, and palladium carbonate and the like can be used to supply the necessary noble metal ion to the electrolyte solution. It will, of course, be understood that similar salts of other noble metal catalysts can also be used.

In addition to palladium-black, other noble metal activating catalysts which can be deposited on the electrode substrate in accordance with this invention includes platinum (Pt), rhodium (Rh), osmium (Os), ruthenium (Ru), and rhenium (Re). The maximum benefits of the invention are achieved when a palladium-black catalyst is deposited by the present process on a palladium or Pd-Ag alloy foil electrode substrate.

The concentration of the noble metal catalyst in the electrolyte is not critical, but it should be sufficiently great to achieve a prompt deposition of the noble metal catalyst on the electrode substrate during the electrolysis step of the process. Very dilute solutions of the noble metal catalyst can be used, but their deposition may take undesirably long periods of time. It is generally preferred to incorporate about 1 to 3 percent by weight of the noble metal catalyst in the alkali metal hydroxide electrolyte solution with about 2 percent by weight of the catalyst being an optimum amount. For example, the preferred electrolyte solution is an 85 percent by weight solution of KOH containing 1 to 3 percent (preferably 2 percent) by weight of palladium chloride ($PdCl_2$) (based on the amount of Pd).

In accordance with the invention, the electrolyte solution is maintained during electrolysis at a temperature that is below its boiling point, but is at least as great as the temperature to which the activated electrode is to be subjected in subsequent use. The electrolyte temperatures used in the electrolysis step of the present process are generally between about 300° F. and 500° F., and normally between about 390° F. and 450° F. Catalyst deposition at such elevated temperatures produces temperature stable electrode products. Further, the elevated temperature activation of this invention in combination with the use of alkali metal hydroxide electrolyte plating solutions enhances the operating life and stability of the activated electrodes, thereby maintaining cell performance and reducing operational costs.

The preferred molten alkali metal hydroxide electrolyte solutions used in accordance with the present process having boiling points well in excess of the temperatures used during electrolysis. For example, molten 85 percent KOH has a boiling point of about 630° F. More dilute alkali metal hydroxide electrolysis solutions can, of course, be used to activate electrodes which are to be used at relatively lower cell operating temperatures.

It is not necessary that the temperature of the electrolysis solution be maintained at precisely that to which the electrode is to be subjected in subsequent use, and the solution may desirably be maintained at or slightly above that temperature. The electrolyte solution is preferably maintained at a temperature not more than 25° F. above the desired temperature of subsequent use, and temperature of 10° to 25° above the use temperature are considered optimum.

In accordance with the invention the noble metal catalyst in the alkali metal hydroxide electrolyte solution is deposited on the electrode substrate by electrolysis. This electrolysis is carried out by passing a direct electric current to the transition metal electrode through the alkali metal hydroxide electrolyte solution. The transition metal electrode to be activated with the catalyst is made cathodic, by connecting it to the negative terminal of a source of direct current.

The catalyst containing alkali metal hydroxide bath is electrolyzed at a current density of about 5 to 150 milliamps per square centimeter of surface area of the transition metal electrode. The surface area of the electrode, as referred to herein and in the appended claims, is the geometric surface area of the electrode. Current densities of about 10 to 25 milliamps per square centimeter (ma./cm.$^2$) are preferred in the electrolysis step of the present invention, and a current density of about 15 ma./cm.$^2$ has been found to be optimum.

Although the duration of the catalyst deposition step of the Pd process is not critical, plating times ranging from 30 seconds up to 30 minutes or more can be used at current density levels of about 5 to 150 ma./cm.$^2$.

The improved electrodes prepared by the present process are graphically illustrated in the accompanying drawings. These drawings show the surface topography of Pd–Ag foil electrodes activated by both the electrodeposition process of the present invention (FIGS. 1-2) and the conventional replacement plating techniques (FIGS. 3-4). FIGS. 1 and 2 show Pd-black catalyst activation layers formed generally by the same electrodeposition process used in example 1, below. The current density used in the plating was 15 ma./cm.$^2$ and the electrolysis was continued for a period of 950 seconds. The activation layer produced on the electrode of FIG. 1 had a black, rough texture and an extremely fine and very uniform grain structure.

FIG. 2 shows the electrode surface of FIG. 1 after 30 hours of H$_2$ cycling through the electrode to simulate operation of the electrode as a fuel cell anode. The H$_2$ cycling was carried out at 1450° F. and a pressure differential across the electrode of 600 mm. of Hg. It is apparent from FIG. 2 that no substantial change occurred in the texture of the activating layer with perhaps the only change being a slight compacting of the grain structure. After 30 hours of such operation the electrode maintained substantially its original appearance.

The activated electrode surface shown in FIG. 3 was produced by Pd-black catalyst deposition on a Pd–Ag foil of the same type shown in FIGS. 1-2 by conventional replacement plating techniques. The replacement plating is carried out by charging the electrode with hydrogen gas, and then immersing the electrode in a 2 percent aqueous solution of PdCl$_2$. Palladium precipitates as a metal on the surface of the palladium alloy foil as the hydrogen leaves the alloy foil and enters the solution.

The grain structure of the electrode surface produced by the replacement plating process is very large compared to that produced by the electrodeposition method of this invention (as shown in FIG. 1). Further, the grain structure of the electrode of FIG. 3 is coarse and discontinuous, and the catalyst plating or coating is not uniformly distributed on the electrode.

FIG. 4 shows the Pd-black replacement plates Pd–Ag foil electrode of FIG. 3 after 30 hours of H$_2$ cycling at 450° F. and a pressure differential of 600 mm. of Hg. As shown in FIG. 4, the catalyst particles have begun to sinter and coalesce after this period of operation and the available catalytic surface area is thereby greatly reduced. Considerable coarsening of the surface layer is caused by the H$_2$ cycling, and in some portions of the surface activation layer complete physical breakdown (sintering) of the catalytic coating has occurred.

In summary, this invention provides an improved process for the activation of fuel cell electrodes by electrolytic deposition of noble metal catalytic materials from an alkali metal hydroxide solution at a temperature at least as great as that at which the electrode is to operate subsequently in a fuel cell. This process produces electrodes which resist structural changes, and therefore changes in catalyst performance during operation of the cell due to aging effects under cell operating temperatures. The present process enhances the operation life of the activated electrodes, improves the stability of catalyst performance, increases the transfer rate of reactant gases through the electrodes, and by these means improves the overall performance of fuel cells utilizing such electrodes and reduces the overall cost of operation of such cells.

It is to be understood that the process of this invention produces fuel electrodes to be used primarily as anodes in any of the well known types of fuel cells including, but not by way of limitation, compact cells, Bacon-type cells, other intermediate temperature fuel cells, and high-temperature cells. Such cells may utilize various electrolytes, either acidic or alkaline, but will preferably use alkaline electrolytes, such as alkali metal hydroxide solutions. The anode electrodes produced by the present process can be utilized with any of the conventional gaseous fuel reactants supplied to such anodes during normal cell operation, such as, for example, hydrogen, methane, or the like.

For a clearer understanding of the invention, specific examples of it are set forth below. These examples are merely illustrative, and are not to be understood as limiting the scope and underlying principles of the invention in any way.

EXAMPLE 1

In this example, a palladium-black catalyst is electrolytically precipitated on a hydrogen diffusion Pd–Ag anode membrane by inserting the membrane in a molten KOH (85 percent) solution containing 2 percent by weight PdCl$_2$ at a temperature of 450° F. The Pd–Ag membrane is made cathodic by connecting it to the negative terminal of a source of direct current. The current density during electrolysis is maintained at 100 ma./cm.$^2$ at a potential of 12 volts.

The electrolysis is carried out for a period of 40 seconds, and the resulting electrode product has a uniform palladium-black activation surface layer. This layer has an activation surface area of 5.2 millicoulombs per square centimeter of (mc./cm.$^2$ of geometric electrode surface area.

EXAMPLE 2

The procedure of example 1 is repeated in this example except that the current density of electrolysis is maintained at 100 ma./cm.$^2$, and the electrolysis is carried out for a period of 100 seconds. The resulting electrode has a uniform Pd-catalyst activation layer on its surface. The activation layer has a surface area of 7.9 mc./cm.$^2$ of geometric surface area of the electrode.

EXAMPLE 3

The procedure of example 1 is duplicated in this example except that the electrolysis is carried out for a period of 162 seconds. The resulting electrode has a catalyst activation surface area of 15.0 mc./cm.$^2$.

EXAMPLE 4

The procedure of example 2 is duplicated in this example except that the electrolysis step of the process is continued for 200 seconds. The resulting electrode product has an activation surface area of 34.6 mc./cm.$^2$ of electrode surface area.

EXAMPLE 5

The procedure of example 2 is again duplicated in this example, except that the electrolysis step of the process is continued for a period of 250 seconds. The resulting electrode product has a catalyst activated surface area of 48.1 mc./cm.$^2$ of geometric electrode surface area.

EXAMPLES 6–8

In these examples the transport rate of hydrogen diffusion across Pd–Ag membrane electrodes activated by the electrolytic deposition of palladium-black catalyst by the process of this invention is compared to transport rates achieved through an unactivated control membrane.

Three identical Pd–Ag alloy membranes are prepared and the membrane of example 6 is set aside untreated as a control. The electrodes of examples 7 and 8 are activated by the general procedure of example 1 using the current densities and times set forth in table 1. After the activation procedure is completed, the activated electrodes of examples 7 and 8 and the untreated control membrane of example 6 are supplied with hydrogen gas at a temperature of 450° F. and a pressure differential across the membrane of 600 mm. of Hg. The transport rates achieved through each of these electrodes are set forth in table 1, below. The transport rates are measured in cubic centimeters of hydrogen diffused or transported through the electrode per square centimeter of geometric electrode surface area per second at standard temperature and pressure conditions (S.T.P.).

TABLE 1

| Example No. | Current Density (ma./cm.$^2$) | Time (sec.) | Transport Rate cc./cm$^2$ sec. |
|---|---|---|---|
| 6 | none | none | $4.8 \times 10^{14}$ |
| 7 | 15 | 270 | $4,940 \times 10^{14}$ |
| 8 | 100 | 265 | $1,940 \times 10^{14}$ |

This invention in its broader aspects is not limited to the specific detail shown and described, but departures may be made from such details within the scope of the accompanying claims without departing from the principles of the invention, and without sacrificing its chief advantages.

What is claimed is:

1. A process for activating fuel cell electrodes which comprises: inserting an electrode to be activated into an electrolyte solution consisting essentially of molten alkali metal hydroxide and containing a minor amount of a salt of a noble metal catalyst, the electrolyte solution being maintained at a temperature below the boiling point of the electrolyte solution but at least as great as the temperature to which the activated electrode is to be subjected in subsequent use, and passing an electric current to the electrode through the alkali metal hydroxide electrolyte solution to cause precipitation of the noble metal catalyst onto the surface of the electrode.

2. The process of claim 1, in which the alkali metal hydroxide electrolyte solution is maintained at a temperature not greater than about 25° F. above the temperature to which the activated electrode is to be subjected in subsequent use.

3. The process of claim 1, in which the electrolyte solution is an 85 percent by weight solution of potassium hydroxide.

4. The process of claim 1 in which the electrode is a transition metal electrode.

5. The process of claim 4 in which electrolysis of the transition metal electrode is carried out at a current density between 5 and 150 milliamps per cm.$^2$ of electrode surface area.

6. The process of claim 5, in which electrolysis is carried out at a current density between about 10 and 25 milliamps per cm.$^2$ of electrode surface area.

7. The process of claim 1, in which the noble metal catalyst is selected from the group consisting of Pd, Ru, Pt, Re, Rh, and Os.

8. The process of claim 7, in which the noble metal catalyst is Pd.

9. The process of claim 7 in which the transition metal electrode is constructed of a metal selected from the group consisting of Zr, Ti, Mo, Pd, Fe, Ni, and alloys of Pd and Ag.

10. The process of claim 4, in which the electrode is Pd.

11. The process of claim 4, in which the electrode is a Pd–Ag alloy.

12. A process for activating Pd or Pd–Ag fuel cell electrodes to improve and stabilize the hydrogen transfer rate through such electrodes during cell operation, which comprises: inserting a Pd or Pd–Ag foil electrode into an electrolyte solution consisting essentially of molten KOH and containing about 1 to 3 percent Pd by weight of the solution in the form of an ionizable salt of Pd; maintaining the electrolyte solution at a temperature of about 450° F., and applying an electric current of about 15 milliamps per cm.$^2$ of electrode surface area to said electrode to cause precipitation of the Pd onto the surface of the electrode.

13. The process of claim 12, in which the ionizable Pd salt is PdCl$_2$ and the electrolyte solution contains about 2 percent by weight of Pd.

14. A process for activating fuel cell electrodes and using the activated electrodes in a fuel cell to generate electrical current and improve and stabilize the hydrogen transfer rate through the electrodes during cell operation which comprises: inserting an electrode to be activated into a molten alkali metal hydroxide electrolyte solution containing a minor amount of a salt of a noble metal catalyst, the temperature of the electrolyte solution being between about 300° F. to 500° F., said temperature being below the boiling point of the electrolyte solution but at least as great as the temperature to which the activated electrode is to be subjected in subsequent use, passing an electric current to the electrode through the molten alkali metal hydroxide solution to cause precipitation of the noble metal catalyst onto the surface of the electrode to form an activated electrode, and then inserting said activated electrode in a fuel cell and operating the fuel cell at a temperature not greater than the temperature of the electrolyte solution.